United States Patent [19]
Merkle et al.

[11] 3,934,414
[45] Jan. 27, 1976

[54] HYDRODYNAMIC TORQUE CONVERTER FOR VEHICLES

[75] Inventors: Hans Merkle, Stuttgart; Eberhard Frötschner, Gerlingen, both of Germany

[73] Assignee: Daimler-Benz Aktiengesellschaft, Germany

[22] Filed: Oct. 9, 1974

[21] Appl. No.: 513,387

[30] Foreign Application Priority Data
Oct. 9, 1973 Germany.......................... 2350600

[52] U.S. Cl. ...................... 60/342; 60/345; 60/356; 60/362
[51] Int. Cl.² ......................................... F16D 33/04
[58] Field of Search ............ 60/332, 341, 342, 345, 60/354, 356, 361, 362

[56] References Cited
UNITED STATES PATENTS

| | | | |
|---|---|---|---|
| 2,911,786 | 11/1959 | Kelley | 60/356 |
| 2,999,400 | 9/1961 | Kelley | 60/362 X |
| 3,313,109 | 4/1967 | Tuck | 60/342 |

*Primary Examiner*—Edgar W. Geoghegan
*Attorney, Agent, or Firm*—Craig & Antonelli

[57] ABSTRACT

A hydrodynamic torque converter, especially for motor vehicles, which is equipped with a pump wheel, a turbine wheel and a guide wheel and with adjustable cascade at least at one of these wheels, preferably at the guide wheel; each blade of such wheel is thereby rotatably supported and is automatically adjustable against a spring force by the torque exerted by the circulating flow of the hydraulic medium.

19 Claims, 4 Drawing Figures

$M = \oint p\, r\, d_A$

HYDRODYNAMIC TORQUE CONVERTER FOR VEHICLES

The present invention relates to a hydrodynamic torque converter for vehicles, especially for motor vehicles, with a pump wheel, a turbine wheel and a guide wheel, and with an adjustable cascade at least at one of these wheels, preferably at the guide wheel.

Hydrodynamic torque converters are used to an increasing extent in the drive connection, especially in motor vehicles. They fulfill most far-reachingly the requirements for a stepless, infinitely variable conversion of the engine power output into driving power for the vehicle. Grounds exist, partly for the reason of further improvement of the transmission properties, partly for the reason of special applications, which make it necessary to change by interaction from the outside the power or performance figure, normally dependent only from the rotational speed, in a desired manner. Thus, for example, high starting speeds at full load are not desirable by reason of the hydraulic losses connected therewith, by reason of the possibly strongly increasing engine noise and by reason of the higher fuel consumption. Lower starting rotational speeds at full load, in contrast thereto, mean high creeping moments at idling rotational speed which may become disagreeable and troublesome by reason of the strong shifting shock and which during slowmotion or crawling drive with a pushing vehicle may even become dangerous to traffic or icy roads.

One therefore aims at expanding the converter range determinative for the improvement of the driving power—that is, the operating range between starting point and coupling point—to as large as possible a driven rotational speed range. The power or performance figure which is responsible for the transmission of the power output is thereby to decrease continuously from the starting point to the coupling point whereby a rotational speed depression which is as large as possible is desirable. Furthermore, the efficiency curve is to be optimum and the coupling point is to lie at a rotational speed ratio which is as large as possible.

Furthermore, applications exist (cooperation of a hydrodynamic torque converter with single shaft gas turbines, electric motors, etc.) in which the special torque-rotational speed characteristics of the drive aggregate requires another variation of the power or performance figure over the rotational speed ratio than exists normally.

Both as solution of these problems existing with a given application as also for the desired improvement of the transmission properties, torque converters of centrifugal as also of centripetal type of construction (adjusting converters) are known whose guide wheel-blades or also whose pump wheel blades are adjusted externally by way of pistons and levers. Thus, for example, according to the German Pat. No. 1,018,285, the front part of the guide wheel blade is adjusted. Also, the British Pat. No. 908,047 shows guide wheel blades whose front portion is displaceable telescopically with respect to the main portion. However, these prior art constructions are very expensive, costly and prone to troubles, and they also do not enable always with certainty the attainment of the aimed-at effect.

The present invention is now concerned with the task of providing a simple and operationally reliable adjustable blade. The underlying problems are solved according to the present invention with the aforementioned hydrodynamic converters in that each blade of a rotor is rotatably supported and is adjustable automatically against a spring force by the torque exerted by the circulating flow. The blade therefore adjusts itself during the operation to an equilibrium condition between the spring force and the flow torque. This automatic adjustment can be used, of course, in connection with the entire blade—and this solution is preferred by the present invention—as also in connection with a partial blade.

The torque converter construction according to the present invention offers the advantage of a very simple construction of the adjustable blades which can be utilized in the pump wheel or in the turbine wheel or preferably in the guide wheel or simultaneously in several wheels or rotors. The adjustment of the blades takes place automatically by the flow against a predetermined spring force. It can be influenced with the same inflow conditions in front of the blade, i.e., with the same conditions of the original direction of the flow ahead of the blade, by the utilization of suitable springs (spring characteristics), by differing combinations of several springs of similar or different characteristics, by the selection of the limitation and location of the adjusting range, by a corresponding coordination of the blades to the adjusting lever and by the selection of the location of the pivot point in the blade. The adjusting inter-relationship can thus be matched or adapted to all possible requirements in a far-reaching manner.

It is additionally proposed by the present invention that a lever transmission or a similarly acting transmission mechanisim is connected between the pivot shaft of the blade and the spring force. In case of a guide wheel with a hub portion disposed inwardly of the blades, each blade is to be arranged on a radially extending pivot pin which terminates in a pivot arm pointing approximately in the circumferential direction whereby all pivot arms engage in an axially movable adjusting ring.

In one embodiment according to the present invention, an axially extending annular recess for the accommodation of the pivot arms and of the adjusting ring is provided in the hub portion of the guide wheel whereby the adjusting ring is axially displaceably supported on that sleeve part which forms the inner boundary of this annular recess. The construction is thereby appropriately made in such a manner that the axial movability of the adjusting ring is limited toward both sides by abutments and the adjusting ring is loaded or stressed by one or several springs in the direction toward a closed blade cascade.

Accordingly, it is an object of the present invention to provide a hydrodynamic torque converter for vehicles, especially for motor vehicles, which avoids by simple means the aforementioned shortcomings and drawbacks encountered in the prior art.

Another object of the present invention resides in a hydrodynamic torque converter for vehicles which is relatively inexpensive and relatively less prone to troubles, yet permits an adaptation of its characteristics to the given requirements.

A further object of the present invention resides in a hydrodynamic torque converter for vehicles which is characterized by an adjustable cascade that is both simple in construction and reliable in operation.

A still further object of the present invention resides in a hydrodynamic torque converter of the type described above which adjusts itself automatically to the predetermined characteristics.

Another object of the present invention resides in a hydrodynamic torque converter for vehicles which avoids high hydraulic losses as well as undesired high engine noises during the start under full load, yet also eliminates low rotational speeds at full load entailing high creeping moments at idling rotational speeds.

These and further objects, features and advantages of the present invention will become more apparent from the following description when taken in connection with the accompanying drawing which shows, for purposes of illustration only, one embodiment in accordance with the present invention, and wherein.

Figure 1:
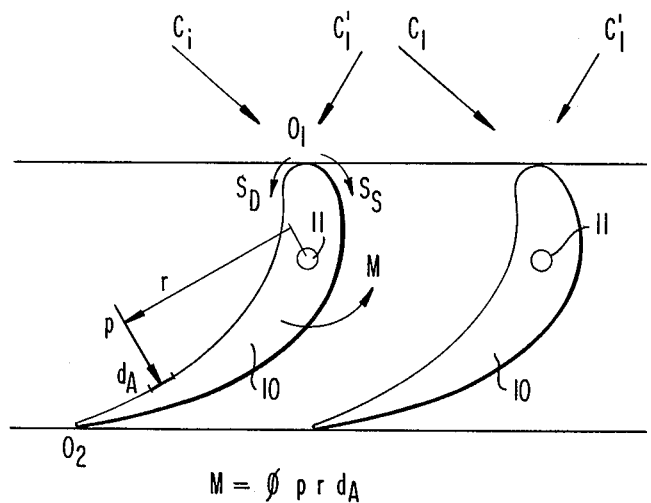
FIG. 1 is a schematic view of a profile of a guide wheel blade for purposes of explaining the flow conditions along such blades.
Figure 2:
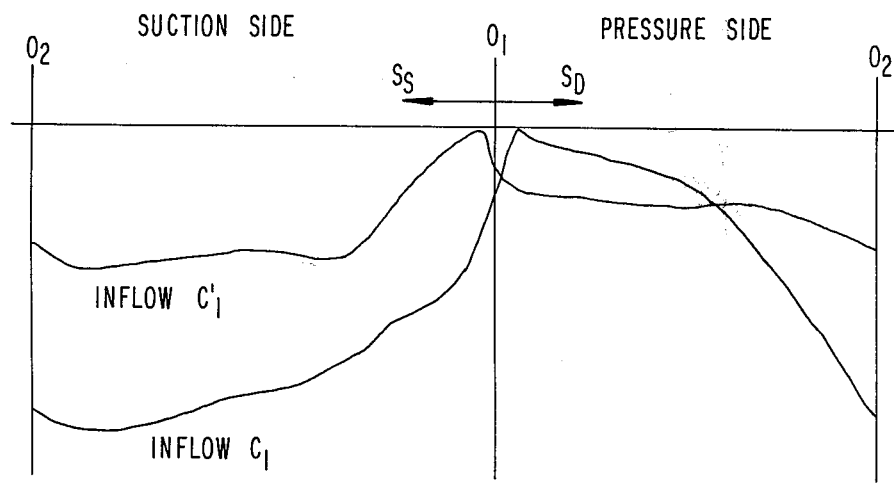
FIG. 2 is a pressure diagram for the blade according to FIG. 1.

Referring now to the drawing wherein like reference numerals are used throughout the various views to designate like parts, according to FIGS. 1 and 2, the pressure difference between the pressure side and the suction side is the larger at the guide wheel blade 10, the larger the flow velocity and the larger the deflection. The pressure difference between two associated blade profile elements (element on the side and element on the suction side) is proportional to the deflection along these elements and proportional to the mass flow per second which flows thereat. In FIG. 2, the pressure curve along the blade surface of a blade profile according to FIG. 1 is illustrated for two inflow directions, i.e., for two initial directions of flow of the hydraulic fluid (belly thrust or positive incidence and back thrust or negative incidence). It can be seen therefrom that during the transition from belly thrust (positive incidence) to back thrust (negative incidence), the pressure difference between the pressure side and the suction side becomes smaller. With another profile shape and profile arrangement (thickness distribution, profile curvature, pitch condition, etc.) another pressure curve may result. Thus, for example, the maximum pressure difference can be displaced more toward the exit or discharge by a displacement of the rear position of the curvature, i.e., by a displacement of the position of a maximum camber from the blade leading edge as a fraction or function of blade chord. If the guide blade 10 according to FIG. 1 is now rotatably supported on a pin 11, then the pressure development along the blade surface produces a torque with respect to this pin 11. The magnitude of this torque influence can be readily seen from the formula indicated in FIG. 1, namely $M = \phi p r dA$.

With the automatic blade adjustment according to the present invention, the blade, as already indicated above, is rotatably supported on a pin 11. In the present invention, the blade 10 is retained in the direction of rotation by a spring. During the operation, the guide blade 10 will then always rotate so far until equilibrium is reached between the blade torque and the spring torque.

With a Föttinger converter, the guide wheel is so shaped that the hydraulic medium flows against the converter pump with a whirl in the direction of rotation, i.e., with a circumferential component at the guide wheel exit pointing in the direction of rotation of the pump wheel. If the converter operates at the starting point, then the hyraulic medium will flow against the guide wheel with a belly thrust (positive incidence). The pressure difference between the pressure side and the suction side becomes large, and with a correct position of the axis of rotation, a large torque is present (see FIG. 2). Within the range of the coupling point, the hydraulic medium flows against the guide wheel with a back thrust (negative incidence), and the torque will thereby become smaller if a constant rotational input speed of the torque converter is assumed. With an increasing rotational input speed, the flow velocity increases and therewith the pressure difference and the moment also increase since the flow velocity is proportional to the rotational speed over wide ranges. It follows therefrom for the illustrated Trilok converter that with a constant rotational input speed, the torque on the guide wheel is larger at the starting point than at the coupling point. The blade is therefore rotated more at the starting point as compared to the coupling point, the whirl in the direction of rotation is therefore correspondingly decreased and the torque converter power or performance figure is therefore increased accordingly. The rotational speed depression becomes larger. With an increasing converter rotational speed, the torque becomes larger with a constant rotational speed ratio but the whirl in the direction of rotation becomes smaller and the torque converter performance figure becomes larger. The torque converter output or performance figure is no longer proportional to the rotational speed.

Figure 3:
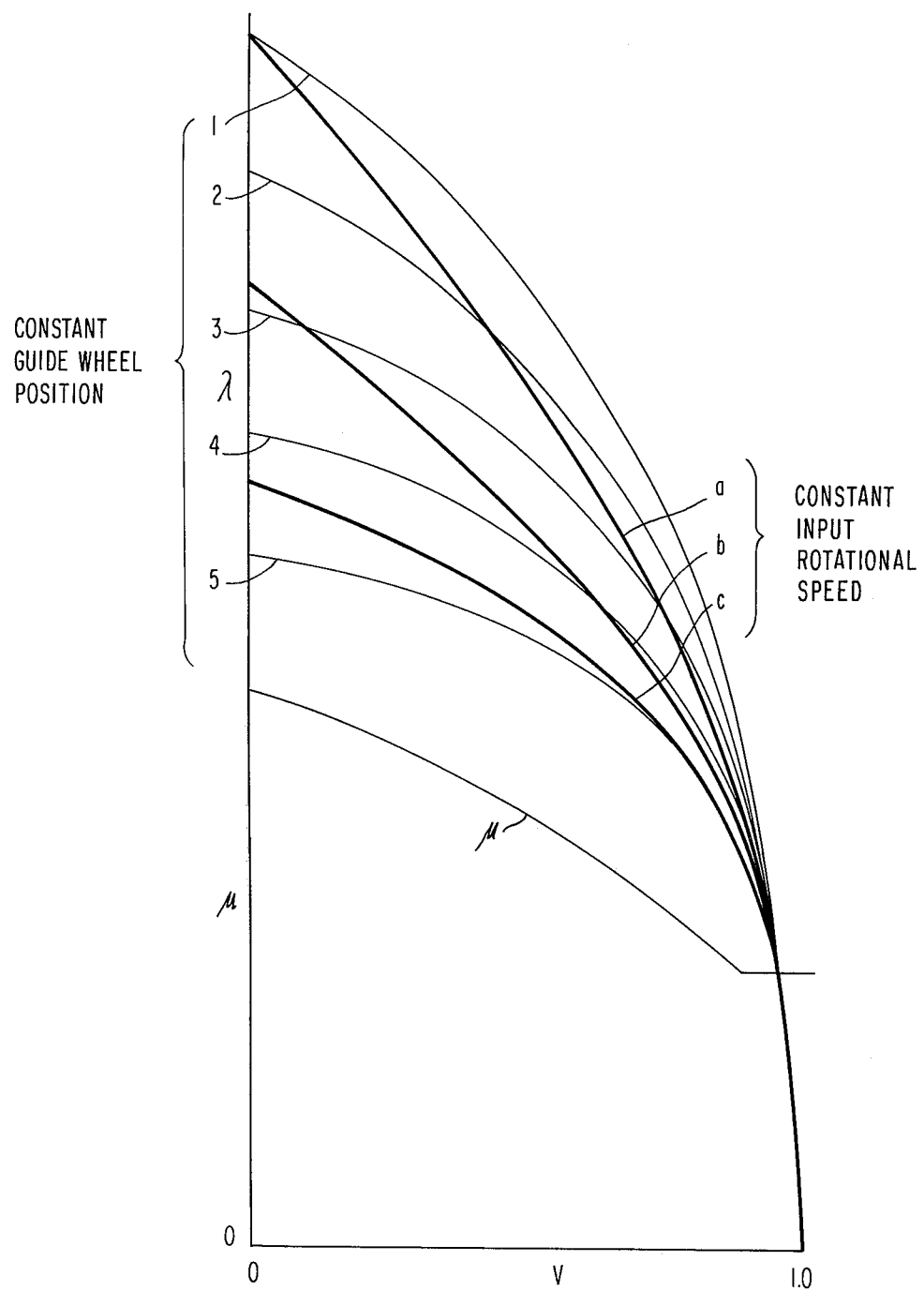
FIG. 3 is a characteristic diagram of a torque converter.

The schematic diagram of the torque converter is illustrated in FIG. 3 as a function of inter-relationship of the pump output figure on the rotational speed ratio. As can be seen by reference to the illustrated diagram of FIG. 3, several advantages are obtained with this torque converter according to the present invention compared to the normal Föttinger converters. Thus, for example, the starting rotational speed at full load is lower and the creeping moment is small at idling rotational speed. The rotational speed depression is large. The position of the coupling point and the efficiency is good. The acceleration behavior can be improved.

Figure 4:
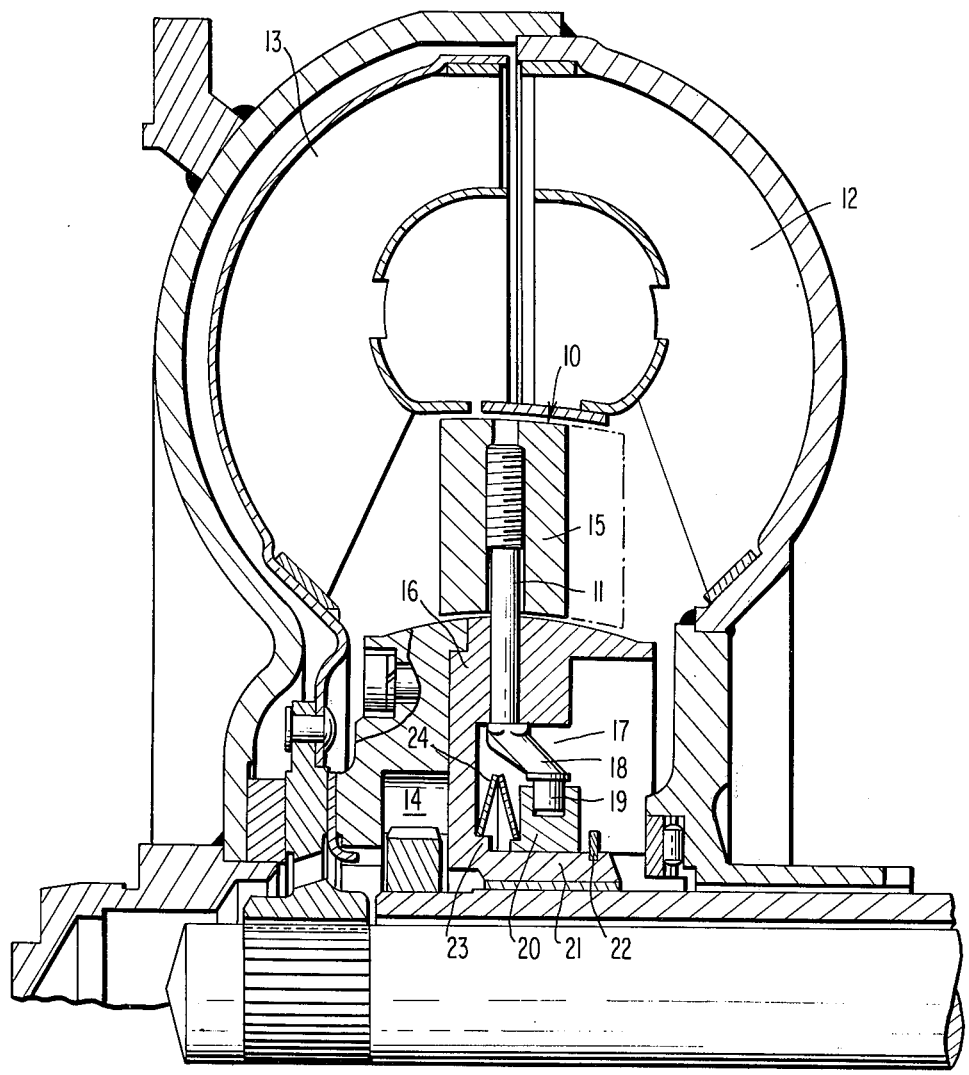
FIG. 4 is a cross-sectional view through a torque converter with guide-wheel blades according to FIG. 1.

According to FIG. 4, the torque converter consists of a pump wheel 12, of a turbine wheel 13 and of a guide wheel 10 with a conventional free-wheeling device 14. The blades 15 of the guide wheel 10 are secured on a respective pivot pin 11 which extends through the hub portion 16 of the guide wheel 10. The pivot pin 11 thereby projects into an annular recess 17 of the hub portion 16. A pivot arm 18 is disposed inwardly at this pivot pin 11, which engages by means of a pin 19 in an adjusting ring 20 which is axially displaceably arranged on the sleeve or bush portion 21 of the hub 16. The axial adjustability of this adjusting ring 20 is limited, on the one hand, by a snap ring 22 and, on the other, by an annular shoulder 23 at the hub portion 16. Cup springs 24 press the adjusting ring 20 always in such a direction that all blades 15 of the guide wheel 10 are rotated in the direction of the closed position.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A hydrodynamic torque converter for vehicles which comprises a pump wheel means, a turbine wheel means and a guide wheel means, an adjustable blade means at least at one of these wheel means, characterized in that the adjustable blade means of a respective wheel means are rotatably supported and are automatically adjustable against a spring force by the torque exerted thereon solely by the circulating flow of the hydraulic medium.

2. A hydrodynamic torque converter for vehicles according to claim 1, characterized in that at least the guide wheel means is provided with adjustable blade means.

3. A hydrodynamic torque converter according to claim 1 characterized in that the adjustable blade means form an adjustable cascade.

4. A hydrodynamic torque converter according to claim 3 characterized in that each blade means of the cascade is rotatably supported.

5. A hydrodynamic torque converter according to claim 1, in which each adjustable blade means includes a pivot pin means, characterized by transmission means interconnected between the pivot pin means of the corresponding blade means and the spring force.

6. A hydrodynamic torque converter according to claim 5, characterized in that said transmission means includes a lever transmission.

7. A hydrodynamic torque converter according to claim 5, characterized in that the transmission means provides a leverage.

8. A hydrodynamic torque converter according to claim 5, characterized in that with a guide wheel means having a hub portion disposed inside of the blade means, each blade means is arranged on a radially extending pivot pin means which terminates in a pivot arm pointing approximately in the circumferential direction, and in that all pivot arms engage in an axially movable adjusting ring means.

9. A hydrodynamic torque converter according to claim 8, characterized in that an axially extending annular recess means is provided in the hub portion of the guide wheel means for the accommodation of the pivot arms and of the adjusting ring means, and in that the axially displaceable adjusting ring means is supported on a sleeve portion which forms the inner boundary of the annular recess means.

10. A hydrodynamic torque converter according to claim 9, characterized in that the axial movability of the adjusting ring means is limited toward both sides by abutments.

11. A hydrodynamic torque converter according to claim 10, characterized in that the adjusting ring means is spring-loaded by at least one spring means in the direction to a closed blade cascade.

12. A hydrodynamic torque converter according to claim 11, characterized in that several spring means are provided which springload the annular adjusting ring means.

13. A hydrodynamic torque converter according to claim 12, characterized in that the adjustable blade means form an adjustable cascade.

14. A hydrodynamic torque converter according to claim 13, characterized in that each blade means of the cascade is rotatably supported.

15. A hydrodynamic torque converter according to claim 2, characterized in that with a guide wheel means having a hub portion disposed inside of the blade means, each blade means is arranged on a radially extending pivot pin means which terminates in a pivot arm pointing approximately in the circumferential direction, and in that all pivot arms engage in an axially movable adjusting ring means.

16. A hydrodynamic torque converter according to claim 15, characterized in that an axially extending annular recess means is provided in the hub portion of the guide wheel means for the accommodation of the pivot arms and of the adjusting ring means, and in that the axially displaceable adjusting ring means is supported on a sleeve portion which forms the inner boundary of the annular recess means.

17. A hydrodynamic torque converter according to claim 15, characterized in that the axial movability of the adjusting ring means is limited toward both sides by abutments.

18. A hydrodynamic torque converter according to claim 17, characterized in that the adjusting ring means is spring-loaded by at least one spring means in the direction to a closed blade cascade.

19. A hydrodynamic torque converter according to claim 18, characterized in that several spring means are provided which spring-load the annular adjusting ring means.

* * * * *